(12) United States Patent
Knaust et al.

(10) Patent No.: US 7,152,719 B2
(45) Date of Patent: Dec. 26, 2006

(54) ADJUSTABLE-LENGTH COMPRESSION SPRING AND SEAT PROVIDED THEREWITH

(75) Inventors: Holger Knaust, Kummersbruck (DE); Rainer Knapp, Deining (DE); Walter Bohm, Feucht (DE)

(73) Assignee: Suspa Holding GmbH, Altdorf (DE)

( * ) Notice: Subject to any disclaimer, the term of this patent is extended or adjusted under 35 U.S.C. 154(b) by 0 days.

(21) Appl. No.: 10/967,164

(22) Filed: Oct. 19, 2004

(65) Prior Publication Data

US 2005/0088021 A1 Apr. 28, 2005

(51) Int. Cl.
*F16F 9/14* (2006.01)

(52) U.S. Cl. .............. 188/310; 188/282.1; 188/322.15; 297/362.13

(58) Field of Classification Search ................ 188/300, 188/280, 281.1, 282.1, 282.3, 285, 288, 289, 188/309, 310, 313, 322.15, 322.22, 299.1; 297/362.13, 361.1, 354.12
See application file for complete search history.

(56) References Cited

U.S. PATENT DOCUMENTS

| | | | | | |
|---|---|---|---|---|---|
| 4,257,582 | A | * | 3/1981 | Wirges | 267/120 |
| 4,632,228 | A | * | 12/1986 | Oster et al. | 188/282.1 |
| 4,784,375 | A | * | 11/1988 | Wirges | 267/64.12 |
| 4,785,921 | A | * | 11/1988 | Hosan et al. | 188/300 |
| 4,844,392 | A | | 7/1989 | Bauer et al. | |
| 4,949,941 | A | * | 8/1990 | Bauer et al. | 267/64.12 |
| 5,079,992 | A | * | 1/1992 | Bauer et al. | 91/422 |
| 5,096,029 | A | * | 3/1992 | Bauer et al. | 188/300 |
| 5,116,028 | A | * | 5/1992 | Mintgen et al. | 267/64.12 |
| 6,112,867 | A | * | 9/2000 | Mintgen et al. | 188/300 |
| 6,260,832 | C1 | * | 7/2001 | Vignocchi et al. | 267/64.15 |
| 6,736,380 | B1 | * | 5/2004 | Knapp | 267/64.12 |
| 2002/0017748 | A1 | * | 2/2002 | Sander et al. | 267/64.12 |
| 2003/0047978 | A1 | | 3/2003 | Knopp | |

FOREIGN PATENT DOCUMENTS

| | | |
|---|---|---|
| DE | 39 24 309 A1 | 12/1990 |
| EP | 1 124 077 A | 8/2001 |
| EP | 1 288 525 A | 3/2003 |
| EP | 1 288 525 A2 | 3/2003 |

OTHER PUBLICATIONS

Patent Abstracts of Japan Bd. 018, Nr. 006 (M-1537). 7. (Jan. 7, 1994) & JP 05 248469 A (Kayaba Ind Co Ltd) (Sep. 24, 1993) "Abstract".

* cited by examiner

*Primary Examiner*—Devon Kramer
(74) *Attorney, Agent, or Firm*—Browdy and Neimark, PLLC

(57) ABSTRACT

A compression spring comprises a casing in which a piston is arranged for displacement, the piston being mounted on a piston rod. In the casing provision is made for two sectional casing chambers which are filled with pressure fluid, at least one of which being defined by the piston. A first operating valve, in an open position, connects the sectional casing chambers to each other and, in a shut-off position, blocks the compression spring. An additional throttle element ensures that an actuation and over-flow assembly between the sectional casing chambers is completely open only when the throttle element, with the valve pin tripped, is simultaneously moved by corresponding actuation into a position of release. Without any such actuation of the throttle element, there will be only throttled flow between the sectional casing chambers. Any inadvertent extension of the piston rod is thus precluded. This is an especially convenient and intuitive way of backrest adjustment in a seat.

18 Claims, 4 Drawing Sheets

ADJUSTABLE-LENGTH COMPRESSION SPRING AND SEAT PROVIDED THEREWITH

BACKGROUND OF THE INVENTION

1. Field of the Invention

The invention relates to an adjustable-length compression spring comprising a casing with a central longitudinal axis, the casing being filled with free-flowing pressure fluid; a guide and seal unit which closes the casing at a first end; a piston rod which, through the guide and seal unit, is extended from, and sealed towards, the first end of the casing, having an outer end; a piston which is joined to the piston rod and sealingly guided in the casing; a first sectional casing chamber which is unilaterally defined by the piston and filled with pressure fluid; a second sectional casing chamber which is connectable to the first sectional casing chamber and filled with pressure fluid; and an operating valve for connection to each other of the sectional casing chambers by an actuation and overflow assembly, the valve comprising a valve pin which, from outside the casing, is movable into a tripped position, in which the valve pin enables the actuation and overflow assembly to be released, and into a shut-off position, in which the valve pin shuts off the actuation and overflow assembly. The invention further relates to a seat comprising a compression spring of this type.

2. Background Art

A blockable compression spring of the generic type is known from EP 1 288 525 A2. Two valves are arranged in series in the actuation and over-flow assembly between the two sectional casing chambers, one of them being the operating valve that includes the valve pin as mentioned above. The second valve is a relay valve that blocks the entire actuation and over-flow assembly independently of the respective position of the operating valve. When the operating valve is open, the relay valve can be transferred by pressure actuation into a position of release with pressure fluid flowing freely between the two sectional casing chambers. This known gas spring is used in adjustable-backrest seats of vehicles. When a backrest is tilted backwards and an upright position is needed, a user will start by actuating the operating valve. Without a user's back pressing on the backrest, the relay valve stays in the position of blocking so that the backrest is kept in the originally tilted position even when the operating valve is tripped. Only when the user leans back sufficiently for generation, by the backrest, of control pressure that transfers the relay valve into a position of release, the operating valve and the relay valve are open, releasing the actuation and overflow assembly. Only then the backrest will conform to a more upright position of a user's back when he straightens up. This idea of transferring the backrest into a more upright position may prevent the compression spring, after actuation of the operating valve, from extending inadvertently and hitting against a user's back, but it is complicated and, above all, hardly intuitive. When the operating valve has been actuated, the user, though wishing a more upright position, must start by leaning back.

SUMMARY OF THE INVENTION

It is an object of the invention to embody a compression spring of the type mentioned at the outset, simultaneously enabling convenient and intuitive adjustment in length of the compression spring.

According to the invention, this object is attained by the features wherein the actuation and overflow assembly comprises an overflow portion with at least two overflow passages connected in parallel; wherein a throttle element for the actuation and overflow assembly is provided, cooperating with a first overflow passage of the overflow passages, the throttle element, from outside the casing, being movable into a position of release, in which it releases the first overflow passage with the valve pin in a tripped position, and the throttle element being movable into a position of throttling, in which it shuts off the first overflow passage with the valve pin also in the tripped position; wherein at least one further overflow passage of the over-flow passages is designed for throttled flow through the at least one further overflow passage to take place in the position of throttling of the throttle element with the operating valve tripped.

The gist of the invention resides in that the actuation and overflow assembly is provided with at least two overflow passages which are connected in parallel, the second overflow passage being a bypass of the first overflow passage that includes the throttle element. As a result, when the operating valve is tripped, pressure fluid is able to flow between the sectional casing chambers even when the throttle element is in a position of throttling. Both overflow channels are open when the throttle element is transferred into the position of release—which can be done from outside—canceling any throttling action of the actuation and/overflow assembly. Consequently, even with the throttle element in a position of throttling, actuation of the operating valve will incite cancellation—even though throttled—of the blockage of the compression spring. Inadvertent extension of the piston rod is precluded by the throttling effect. The result is convenient and simultaneously intuitive adjustment in length of the compression spring.

A reduced number of components is needed when the throttle element is a sealing element which is displaceable in relation to the valve pin, in the position of throttling being sealed inwardly towards the valve pin; and outwardly towards a casing-chamber portion which forms a defining wall for the first as well as the second overflow passage.

A throttle element in the form of a displaceable sealing ring, in particular an O-ring, can be manufactured at a low cost and from material of little wear and nevertheless excellent sealing properties.

Actuation of the throttle element by pressure modification, incited from outside, of the pressure fluid in at least one of the sectional casing chambers can be put into practice easily, needing no mechanical articulation of the throttle element.

Embodying the throttle element for automatic return from the position of release into the position of throttling when the valve pin, after valve operation, is back in the shut-off position implies a smart way of integration into a compression spring and high convenience of operation.

An energy storing device in the form of a compressed-gas chamber and oil used as a pressure fluid have shown excellent results, depending on the field of application.

It is another object of the invention to specify a seat in which the advantages of the compression spring according to the invention will give a good account of themselves.

In accordance with the invention, this object is attained in a seat in which the compression spring transfers a backrest of the seat from a more inclined to a less inclined position by extension of the piston rod out of the casing.

In the seat according to the invention, the backrest is prevented from inadvertently shooting up into an upright position by extension of the piston rod after the valve pin has been tripped, giving the seated person a push. Instead, the backrest moves up throttled and slowly. If the throttle element is additionally transferred into a position of release, controlled cancellation of the throttling effect is possible, enabling more rapid regulation of the backrest.

An operating member which is disposed on the seat in the vicinity of the seating area enables the valve pin to be tripped conveniently.

When a user actuates the throttle element by exerting pressure on the resting area of the backrest of the seat, with the valve pin tripped, this will then cancel the throttling effect of the compression spring and enable the inclined backrest to be adjusted rapidly.

The compression spring according to the invention is used for instance in office chairs. By alternative, it can be employed for example in vehicle seats such as seats in busses, trains or planes. Further application is conceivable in seats of movie theaters.

Further features, advantages and details of the invention will become apparent from the ensuing description of an exemplary embodiment, taken in conjunction with the drawing:

DESCRIPTION OF A PREFERRED EMBODIMENT

Figure 1:
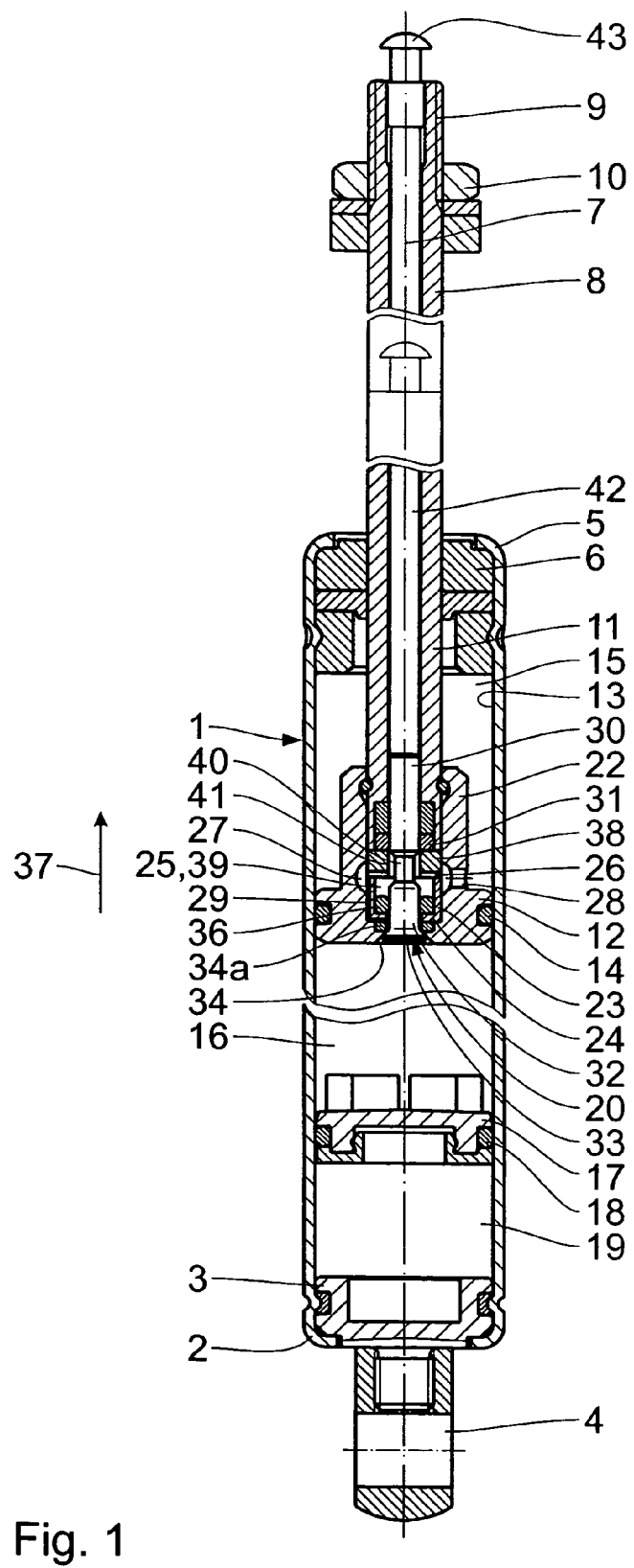
FIG. 1 is a longitudinal sectional view of a compression spring.

The blockable, adjustable-length compression gas spring seen in its entirety in FIG. 1 includes a substantially cylindrical casing 1 made from a tube, one end 2 of which is closed gas-tightly by a bottom 3 which a fastening element 4 is attached to. The other end 5 of the casing 1 is provided with an annular guide and seal unit 6 for liquid sealing, the unit 6 serving to guide and seal a piston rod 8 that is displaceable in the casing 1 concentrically of the central longitudinal axis 7 thereof. The free end 9, outside the casing 1, of the piston rod 8 is likewise provided with a fastening element 10.

The end 11, inside the casing 1, of the piston rod 8 is provided with a piston 12 which is guided on an inside wall 13 of the casing 1 and liquid-sealed towards the wall 13 by a seal 14. The piston 12 divides the inside of the casing 1 into a first sectional casing chamber 15 between the piston 12 and the guide and seal unit 6 and a second sectional casing chamber 16 that faces away from the chamber 15. The second sectional casing chamber 16 is again defined by a sliding piston 17 which slides on the inside wall 13 of the casing 1 and is liquid-sealed towards it by a seal 18. A compressed gas chamber 19 is disposed between the sliding piston 17 and the bottom 3, holding gas under pressure and serving as an energy storing device. The sectional casing chambers 15, 16 are filled with fluid as a pressure medium, for instance hydraulic oil.

The piston 12 includes a blocking valve 20 as an operating valve by means of which to unite, or separate from each other, the sectional casing chambers 15, 16. An actuation and overflow assembly 21 is produced between the sectional casing chambers 15, 16 when they are united (cf. FIG. 5). FIG. 1 shows the blocking valve 20 in a shut-off position. The blocking valve 20 comprises a valve gate 22 on the side of the piston 12 that is turned towards the seal and guide unit 6. The hollow valve gate 22 holds a hollow cylindrical overflow gate 23 which has an annular bottom 24 turned towards the second sectional casing chamber 16. Inwards, towards the central longitudinal axis 7, the overflow gate 23 defines a first overflow passage 25 which continues the actuation and overflow assembly 21 towards the first sectional casing chamber 15. To this end, the overflow gate 23 comprises side-cuts 26 that join the inside of the overflow gate 23 to an annular chamber 27 inside the valve gate 22. Via another side-cut 28, the annular chamber 27 is again connected to the first sectional casing chamber 15.

The outside wall of the annular bottom 24 and of the overflow gate 23 is provided with a bypass groove 29 which constitutes a second overflow passage which, as part of the overflow assembly 21, is connected in parallel to the first overflow passage 25, serving as a bypass therefor. With the actuation and overflow assembly 21 open, the bypass groove 29, in the same way as the first overflow passage 25, unites the second sectional casing chamber 16 and the first sectional casing chamber 15 via the annular chamber 27 and the side cut 28 in the valve gate 22.

A sliding valve pin 30, which is coaxial of the axis 7 and shown in a shut-off position in FIG. 1, passes through the overflow gate 23. By means of a seal 31, the valve pin 30 is externally sealed in between the overflow gate 23 and the hollow piston rod 8. The end of the valve pin 30 that is turned towards the second sectional casing chamber 16 is provided with a valve disk 32 of two-stage conical expansion. Disposed on the free end of the valve pin 30 is a conical wall 33, of greater diameter, of the valve disk 32, serving for defined motion of the valve pin 30 in the push-out direction thereof. To this end, the conical wall 33 cooperates with an opposite surface 34 of the valve gate 22. In the valve-20 shut-off position, a seal 34a of rectangular cross-sectional shape seals the conical wall 33 towards the valve gate 22. Between the two conical surfaces, the valve pin 30 comprises a cylindrical surface 35 which, in the position of throttling seen in FIG. 1, seals towards the overflow gate 23 via a seal that constitutes a throttle element 36. The throttle element 36 is an O-ring.

In the position of throttling, the throttle element 36 rests on the annular bottom 24 of the overflow gate 23 in the direction towards the second sectional casing chamber 16. In this way, the throttle element 36 is safe-guarded against further dislocation along the central longitudinal axis 7 towards the second sectional casing chamber 16. In the opposite direction i.e., in the direction of the arrow 37, relocation of the throttle element 36 is possible within an overflow chamber 39 which is formed in the valve gate 22 by the overflow gate 23 and an adjoining intermediate ring 38; the over-flow chamber 39 is part of the first overflow passage 25, which is going to be described in detail.

In the area between its portion that rests on the seal 31 and the valve disk 32, the valve pin 30 comprises a tapered section 40, an annular chamber 41 being formed between this section 40 and the neighbouring parts, namely the overflow gate 23 and the intermediate ring 38; this chamber 41 communicates with the side cuts 26.

A valve operating rod 42 is disposed in the hollow piston rod 8; it bears against the valve pin 30 and is displaceable in the direction of the axis 7 and can be actuated by being pushed from the end 9. The free end, projecting from the piston rod 8, of the valve operating rod 42 is an operating button 43.

Figure 2:
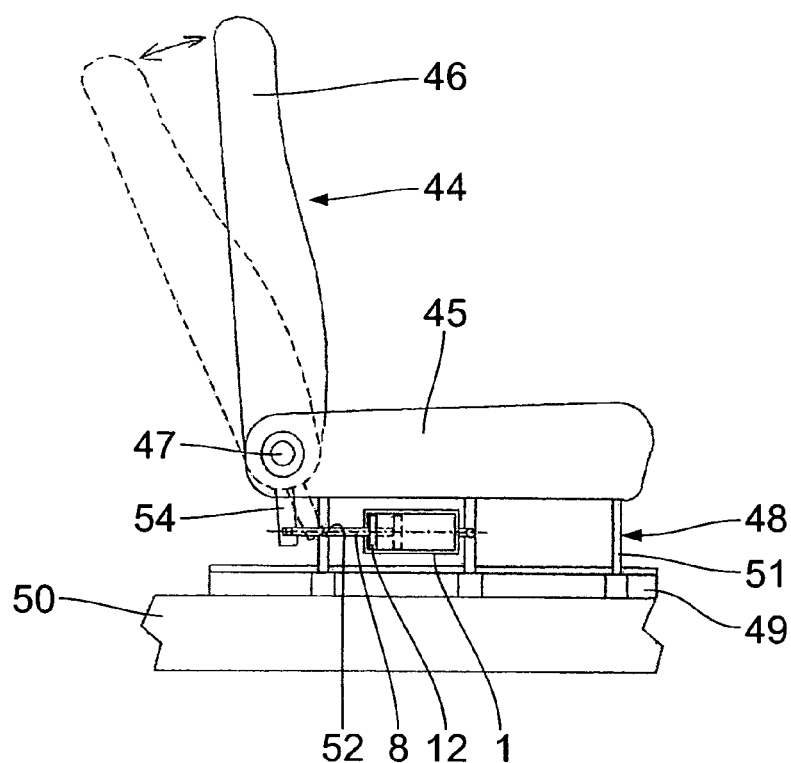
FIG. 2 is a diagrammatic view of a seat including a compression spring according to the invention.

FIG. 2 is a diagrammatic view of the arrangement of the compression gas spring of FIG. 1 on a seat 44 (also plotted diagrammatically). The seat 44 has a seating area 45 and a backrest 46. The backrest 46 can be pivoted about a pivot joint 47 towards the seating area 45. The seat 44 is a vehicle seat, for example in a bus, train or plane.

A supporting frame 48 is disposed underneath the seating area 45, connecting the seating area 45 with a supporting rail 49 which is fixed to a bottom 50. In a manner known per se, the supporting frame 48 is connected with the supporting rail 49 in such a way that the seat 44 can be relocated for modification of the distance between successive seats 44. The supporting frame 48 comprises three vertical props 51 which are arranged successively in the direction of relocation. The compression gas spring according to FIG. 1 is disposed horizontally between the middle prop 51 and the rear prop 51 that adjoins the pivot joint 47. The fastening element 4 is rotatably mounted on the middle prop 51. The piston rod 8 is axially guided on a guide hole 52 in the rear prop 51. Via the fastening element 10 and a coupling link 53, the free end 9 of the piston rod 8 is connected with a coupling rod 54, with a pivot joint 55 being disposed between the coupling link 53 and the coupling rod 54, having a pivoting axis that is parallel to the pivot joint 47. The coupling rod 54 constitutes a prolongation of the backrest 46 beyond the pivot joint 47; it is tightly connected with the backrest 46 for pivoting about the joint 47.

Solid lines in FIG. 2 show the backrest 46 in an upright position with the piston rod 8 of the compression gas spring being maximally extended from the casing 1. Dashed lines in FIG. 2 illustrate the backrest 46 in an inclined position as compared to the upright position, with the backrest 46 and the coupling rod 54 being pivoted about the pivot joint 47 and with the piston rod 8 and the piston 12 that is joined thereto being retracted into the casing 1 of the compression gas spring.

Figure 3:
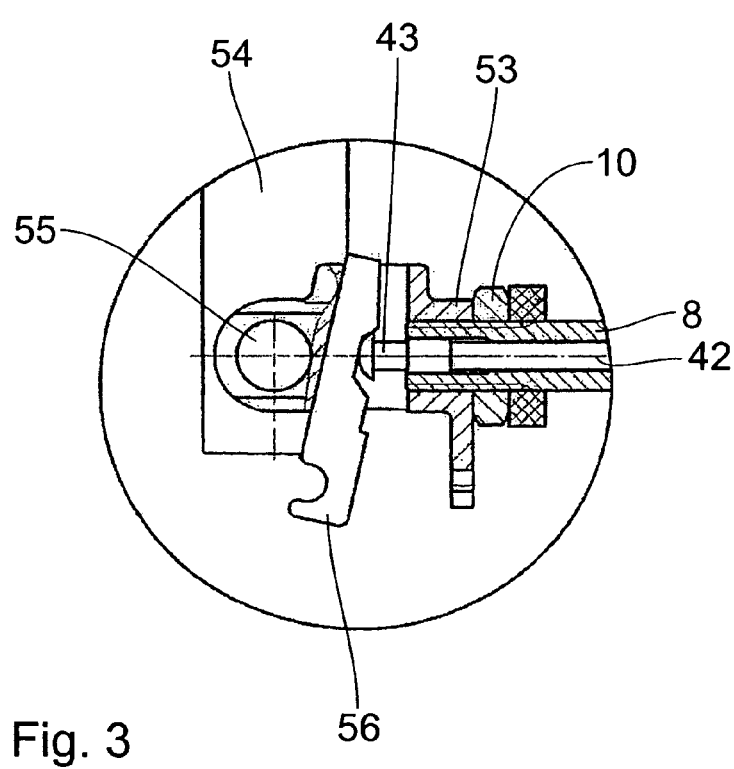
FIG. 3 is a view, on an enlarged scale, of details of FIG. 2 (not visible in FIG. 2) of a valve actuation arrangement of the compression spring.

The detailed view of FIG. 3 shows that, for actuation of the operating button 43, provision is made for a complementary contact portion of an operating member 56 in the area of connection between the coupling rod 54 and the piston rod 8, with the operating member 56 resting pivotably on the coupling link 53 and, for example by a corresponding Bowden cable, cooperating with an operating lever or press button disposed in the vicinity of the underside of the seating area 45 for actuation of the valve operating rod 42.

Figure 4:
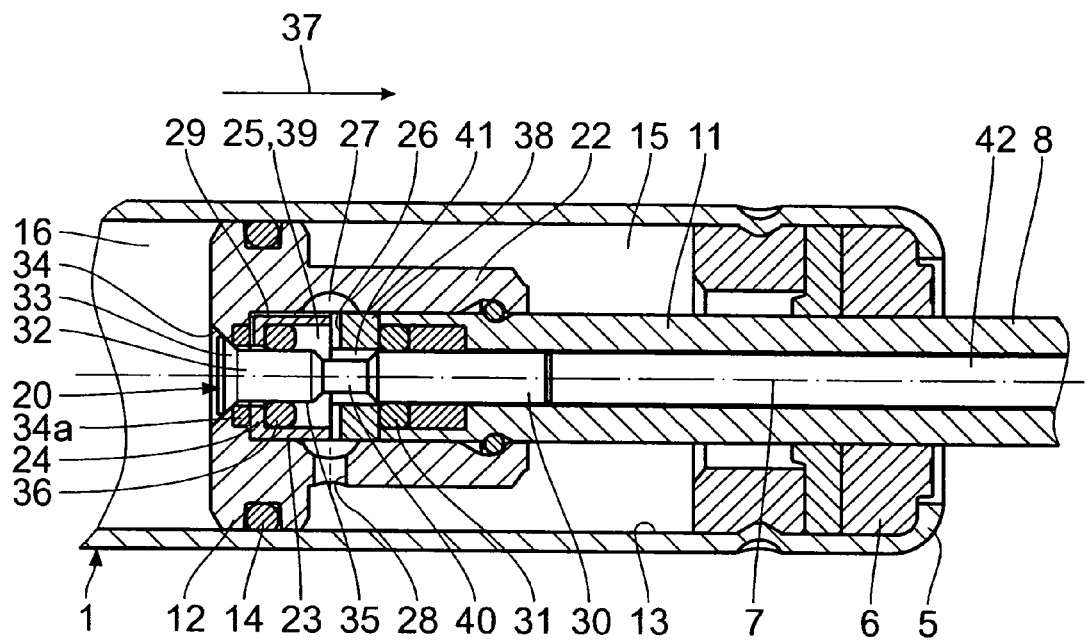
FIGS. 4 to 7 are instantaneous views of details of the compression spring in the vicinity of a piston thereof, illustrating the displacement of a valve pin and a throttle element upon actuation of the valve of the compression spring.

The following is a description of the mode of operation of the compression gas spring of FIG. 1 in a situation of incorporation according to FIGS. 2 and 3 upon actuation of the blocking valve 20, taken in conjunction with the instantaneous views of FIGS. 4 to 7:

FIG. 4 illustrates the blocking valve 20 of FIG. 1 with the valve pin 30 in the shut-off position and the throttle element 36 in a position of throttling. In this position, seen in FIGS. 1 and 4, of the blocking valve 20, the pressure of the hydraulic oil in the sectional casing chamber 15 is higher than it is in the sectional casing chamber 16 when the compression gas spring is relieved. This is due to the fact that the cross-sectional area of the piston 12 that is turned towards the sectional casing chamber 16 exceeds the cross-sectional area turned towards the sectional casing chamber 15, this latter area being reduced by the cross-sectional surface of the piston rod 8. The higher pressure inside the first sectional casing chamber 15 presses the throttle element 36 in the first overflow passage 25 against the annular bottom 24 counter to the direction of the arrow 37. Consequently, in FIG. 4, the compression gas spring is not tripped and the first overflow passage 25 is being blocked by the throttle element 36. In this case, the backrest 46 is in the inclined position shown by dashed lines in FIG. 2.

Figure 5:
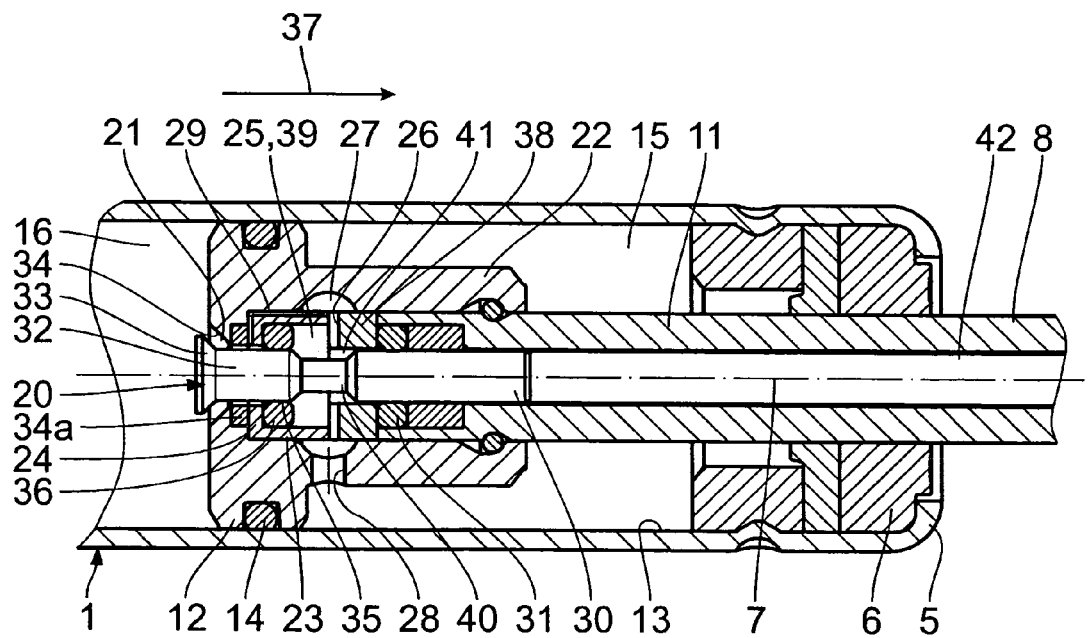

FIG. 5 shows the valve pin 30 in a position of tripping displaced to the left as opposed to the shut-off position, the valve pin 30 having been moved into this position by the operating button 43 being actuated by the operating member 56 and the operating lever joined thereto. In this position of the valve pin 30 on the one hand and the throttle element 36 on the other, the throttle element 36 keeps sealing the overflow gate 23 towards the cylindrical wall 35 of the valve pin 30 so that the first overflow passage 25 remains blocked. Flow connection between the sectional casing chambers 15, 16 is exclusively ensured by the bypass groove 29. Therefore, in FIG. 5, the compression gas spring is simultaneously tripped and maximally throttled so that the relieved backrest 46 slowly returns from a strongly inclined position into a less inclined position.

If a user wants to move the backrest 46 from a slightly inclined into a more strongly inclined position, then he trips the blocking valve 20, exerting by his back additional pressure on the resting area of the backrest 46. This pressure is conferred to the second sectional casing chamber 16 by way of the pivot joint 47, the coupling rod 54, the pivot joint 55, the coupling link 53, the fastening element 10, the piston rod 8 and the piston 12. As from a certain pressure on the backrest 46 onwards, this will lead to the pressure in the second sectional casing chamber 16 exceeding that in the first sectional casing chamber 15. With this status accomplished, the difference in pressure will lead to the throttle element 36 shifting in the direction of the arrow 37 in the overflow chamber 39, until reaching the position of release, according to FIG. 6, of maximum displacement to the right in the overflow chamber 39. During displacement of the throttle element 36, as long as the throttle element 36 seals towards the cylindrical wall 35 on the one hand and outwards towards the overflow gate 23 on the other, hydraulic oil continues to flow through between the opposite surface 34 and the cylindrical wall 35 into the overflow gate 23.

Figure 6:
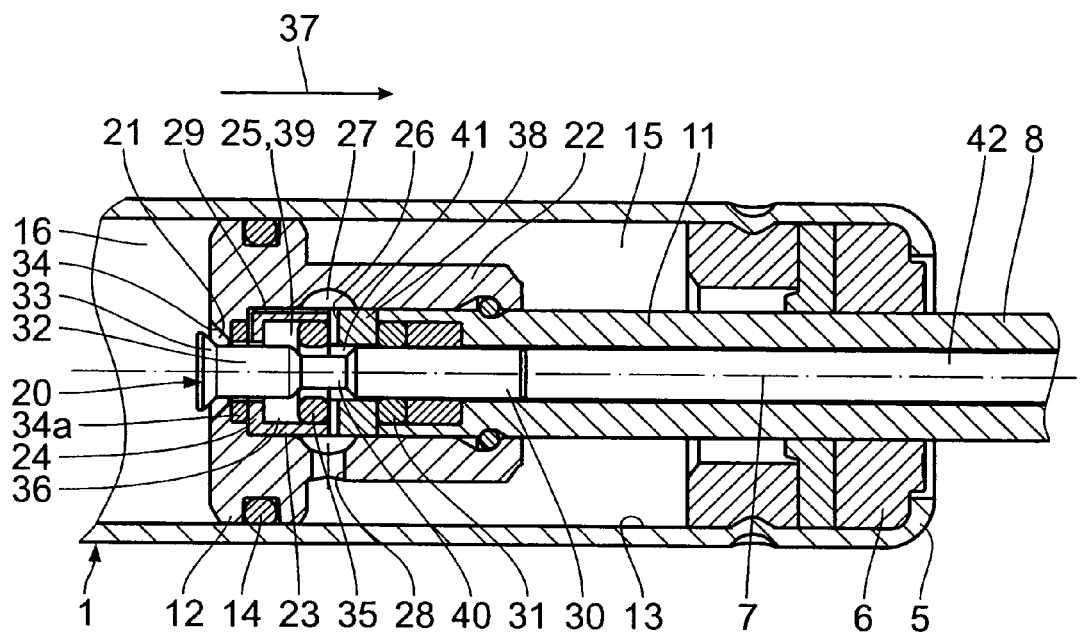

FIG. 6 shows the throttle element 36 in the position of release in which it is maximally displaced in the direction of the arrow 37 inside the overflow gate 23, bearing against the intermediate ring 38. The valve pin 30 is still in the tripped position in FIG. 6, meaning that the user continues to actuate the operating lever for actuation of the operating button 43. In this position of the valve pin 30 on the one hand and of the throttle element 36 on the other, hydraulic oil is able to flow between the first sectional casing chamber 15 and the second sectional casing chamber 16 through the first overflow passage 25 as well as through the bypass groove 29. There being correspondingly inferior resistance, the piston may now be pushed into the casing 1 so that the backrest 46 can be adjusted conveniently to a more inclined position.

Figure 7:
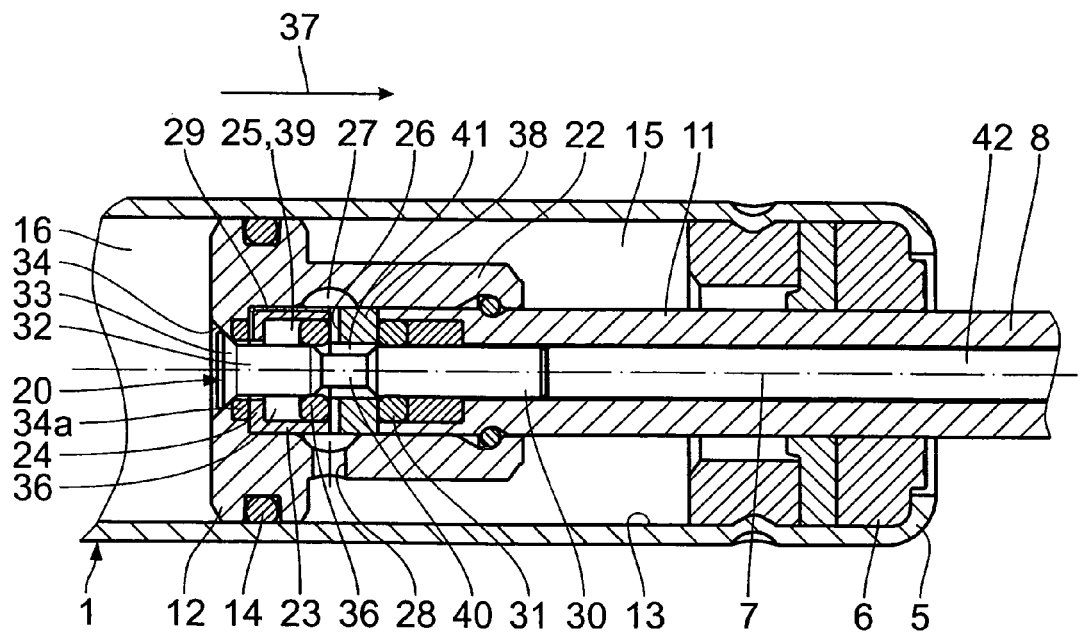

If the user wishes to stop the adjustment of the backrest 46, he releases the operating lever that acts on the operating button 43 when the backrest 46 is in the desired position so that the blocking valve 20 moves into the shut-off position seen in FIG. 7. In this position, with the valve pin 30 in the shut-off position and the throttle element 36 in the position of release, the seal 34a seals the conical wall 33 towards the valve gate 22, blocking the actuation and overflow assembly 21. Consequently, the valve 20 is blocked in the position of FIG. 7. Owing to the higher pressure (as explained above) in the first sectional casing chamber 15 as compared to the second sectional casing chamber 16, the throttle element 36, subsequently to the instantaneous view of FIG. 7, is automatically relocated from the position of release back into the position of throttling. Hydraulic oil flows through the bypass groove 29. At the end of this process of relocation the blocking valve 20 will again be in the position seen in FIG. 4.

What is claimed is:

1. An adjustable-length compression spring, comprising
   a casing (1) with a central longitudinal axis (7), the casing (1) being filled with free-flowing pressure fluid;
   a guide and seal unit (6) which closes the casing (1) at a first end (5);
   a piston rod (8) which, through the guide and seal unit (6), is extended from, and sealed towards, the first end (5) of the casing (1), having an outer end (9);
   a piston (12) which is joined to the piston rod (8) and sealingly guided in the casing (1);
   a first sectional casing chamber (15) which is unilaterally defined by the piston (12) and filled with pressure fluid;
   a second sectional casing chamber (16) which is connectable to the first sectional casing chamber (15) and filled with pressure fluid; and
   an operating valve (20) for connection to each other of the sectional casing chambers (15, 16) by an actuation and overflow assembly (21), the valve (20) comprising a valve pin (30) which, from outside the casing (1), is movable into a tripped position, in which the valve pin (30) enables the actuation and overflow assembly (21) to be released, and into a shut-off position, in which the valve pin (30) shuts off the actuation and overflow assembly (21);
   wherein the actuation and overflow assembly (21) comprises an overflow portion with at least two overflow passages (25, 29) connected in parallel;
   wherein a throttle element (36) for the actuation and overflow assembly (21) is provided, cooperating with a first overflow passage (25) of the overflow passages (25, 29),
      the throttle element (36), from outside the casing (1), being movable into a position of release, in which it releases the first overflow passage (25) with the valve pin (30) in a tripped position, and
      the throttle element (36) being movable into a position of throttling, in which it shuts off the first overflow passage (25) with the valve pin (30) also in the tripped position;
   wherein at least one further overflow passage (29) of the overflow passages (25, 29) is designed for throttled flow through the at least one further overflow passage (29) to take place in the position of throttling of the throttle element (36) with the operating valve (20) tripped; and
   wherein the throttle element (36) is a sealing element which is displaceable in relation to the first overflow passage (25) and which is sealed in a position of throttling
      inwardly towards the valve pin (30); and
      outwardly towards a casing-chamber portion (23) which forms a defining wall for the first overflow passage (25) as well as the at least one further overflow passage (29).

2. A compression spring according to claim 1, wherein the throttle element (36) is a displaceable sealing ring.

3. A compression spring according to claim 1, comprising an embodiment of the throttle element (36) such that actuation thereof is effected by pressure modification, incited from outside, of the pressure fluid in at least one of the sectional casing chambers (15, 16).

4. A compression spring according to claim 1, comprising an embodiment of the throttle element (36) for automatic return from the position of release into the position of throttling when the valve pin (30), after valve operation, is back in the shut-off position.

5. A compression spring according to claim 1, comprising a compressed-gas chamber as an energy storing device (19).

6. A compression spring according to claim 1, comprising oil as a pressure fluid.

7. A compression spring according to claim 1, wherein the throttle element (36) is an O-ring.

8. A seat (44) comprising an adjustable-length compression spring, comprising
   a casing (1) with a central longitudinal axis (7), the casing (1) being filled with free-flowing pressure fluid;
   a guide and seal unit (6) which closes the casing (1) at a first end (5);
   a piston rod (8) which, through the guide and seal unit (6), is extended from, and sealed towards, the first end (5) of the casing (1), having an outer end (9);
   a piston (12) which is joined to the piston rod (8) and sealingly guided in the casing (1);
   a first sectional casing chamber (15) which is unilaterally defined by the piston (12) and filled with pressure fluid;
   a second sectional casing chamber (16) which is connectable to the first sectional casing chamber (15) and filled with pressure fluid; and
   an operating valve (20) for connection to each other of the sectional casing chambers (15, 16) by an actuation and overflow assembly (21), the valve (20) comprising a valve pin (30) which, from outside the casing (1), is movable into a tripped position, in which the valve pin (30) enables the actuation and overflow assembly (21) to be released, and into a shut-off position, in which the valve pin (30) shuts off the actuation and overflow assembly (21);
   wherein the actuation and overflow assembly (21) comprises an overflow portion with at least two overflow passages (25, 29) connected in parallel;
   wherein a throttle element (36) for the actuation and overflow assembly (21) is provided, cooperating with a first overflow passage (25) of the overflow passages (25, 29),
      the throttle element (36), from outside the casing (1), being movable into a position of release, in which it releases the first overflow passage (25) with the valve pin (30) in a tripped position, and
      the throttle element (36) being movable into a position of throttling, in which it shuts off the first overflow passage (25) with the valve pin (30) also in the tripped position;
   wherein at least one further overflow passage (29) of the overflow passages (25, 29) is designed for throttled flow through the at least one further overflow passage (29) to take place in the position of throttling of the throttle element (36) with the operating valve (20) tripped; and
   wherein the throttle element (36) is a sealing element which is displaceable in relation to the first overflow passage (25) and which is sealed in a position of throttling inwardly towards the valve pin (30); and
outwardly towards a casing-chamber portion (23) which forms a defining wall for the first overflow passage (25) as well as the at least one further overflow passage (29); and wherein the compression spring transfers a backrest (46) of the seat (44) from a more inclined to a less inclined position by extension of the piston rod (8) out of the casing (1).

9. A seat according to claim 8, wherein the valve pin (30) can be operated by an operating member (56) which is disposed on the seat (44) in the vicinity of a seating area (45).

10. A seat according to claim 8, comprising an arrangement of the compression spring such that, with the valve (20) operated, the throttle element (36) is movable into the position of release by pressure on a resting area of the backrest (46).

11. An adjustable-length compression spring, comprising
a casing (1) with a central longitudinal axis (7), the casing (1) being filled with free-flowing pressure fluid;
a guide and seal unit (6) which closes the casing (1) at a first end (5)
a piston rod (8) which, through the guide and seal unit (6), is extended from, and sealed towards, the first end (5) of the casing (1), having an outer end (9);
a piston (12) which is joined to the piston rod (8) and sealingly guided in the casing (1);
a first sectional casing chamber (15) which is unilaterally defined by the piston (12) and filled with pressure fluid;
a second sectional casing chamber (16) which is connectable to the first sectional casing chamber (15) and filled with pressure fluid; and
an operating valve (20) for connection to each other of the sectional casing chambers (15, 16) by an actuation and overflow assembly (21), the valve (20) comprising a valve pin (30) which, from outside the casing (1), is movable into a tripped position, in which the valve pin (30) enables the actuation and overflow assembly (21) to be released, and into a shut-off position, in which the valve pin (30) shuts off the actuation and overflow assembly (21);
wherein the actuation and overflow assembly (21) comprises an overflow portion with at least two overflow passages (25, 29) connected in parallel;
wherein a throttle element (36) for the actuation and overflow assembly (21) is provided, cooperating with a first overflow passage (25) of the overflow passages (25, 29),
the throttle element (36), from outside the casing (1), being movable into a position of release, in which it releases the first overflow passage (25) with the valve pin (30) in a tripped position, and
the throttle element (36) being movable into a position of throttling, in which it shuts off the first overflow passage (25) with the valve pin (30) also in the tripped position;
wherein at least one further overflow passage (29) of the overflow passages (25, 29) is designed for throttled flow through the at least one further overflow passage (29) to take place in the position of throttling of the throttle element (36) with the operating valve (20) tripped;
wherein the throttle element (36) is a displaceable sealing ring and actuation thereof is effected by pressure modification, incited from outside, of the pressure fluid in at least one of the sectional casing chambers (15, 16); and wherein the throttle element (36) is a sealing element which is displaceable in relation to overflow passage (25), in the position of throttling being sealed
inwardly towards the valve pin (30); and
outwardly towards a casing-chamber portion (23) which forms a defining wall for the first (25) as well as the at least one further (29) overflow passage.

12. A compression spring according to claim 11, comprising an embodiment of the throttle element (36) for automatic return from the position of release into the position of throttling when the valve pin (30), after valve operation, is back in the shut-off position.

13. A compression spring according to claim 11, comprising a compressed-gas chamber as an energy storing device (19).

14. A compression spring according to claim 11, comprising oil as a pressure fluid.

15. A compression spring according to claim 11, wherein the throttle element (36) is an O-ring.

16. A seat (44) comprising an adjustable-length compression spring, comprising
a casing (1) with a central longitudinal axis (7), the casing (1) being filled with free-flowing pressure fluid;
a guide and seal unit (6) which closes the casing (1) at a first end (5);
a piston rod (8) which, through the guide and seal unit (6), is extended from, and sealed towards, the first end (5) of the casing (1), having an outer end (9);
a piston (12) which is joined to the piston rod (8) and sealingly guided in the casing (1);
a first sectional casing chamber (15) which is unilaterally defined by the piston (12) and filled with pressure fluid;
a second sectional casing chamber (16) which is connectable to the first sectional casing chamber (15) and filled with pressure fluid; and
an operating valve (20) for connection to each other of the sectional casing chambers (15, 16) by an actuation and overflow assembly (21), the valve (20) comprising a valve pin (30) which, from outside the casing (1), is movable into a tripped position, in which the valve pin (30) enables the actuation and overflow assembly (21) to be released, and into a shut-off position, in which the valve pin (30) shuts off the actuation and overflow assembly (21);
wherein the actuation and overflow assembly (21) comprises an overflow portion with at least two overflow passages (25, 29) connected in parallel;
wherein a throttle element (36) for the actuation and overflow assembly (21) is provided, cooperating with a first overflow passage (25) of the overflow passages (25, 29),
the throttle element (36), from outside the casing (1), being movable into a position of release, in which it releases the first overflow passage (25) with the valve pin (30) in a tripped position, and
the throttle element (36) being movable into a position of throttling, in which it shuts off the first overflow passage (25) with the valve pin (30) also in the tripped position;
wherein at least one further overflow passage (29) of the overflow passages (25, 29) is designed for throttled flow through the at least one further overflow passage (29) to take place in the position of throttling of the throttle element (36) with the operating valve (20) tripped;

wherein the throttle element (36) is a sealing ring which is displaceable in relation to the first overflow passage (25) and actuation thereof is effected by pressure modification, incited from outside, of the pressure fluid in at least one of the sectional casing chambers (15, 16); and wherein the compression spring transfers a backrest (46) of the seat (44) from a more inclined to a less inclined position by extension of the piston rod (8) out of the casing (1).

17. A seat according to claim 16, wherein the valve pin (30) can be operated by an operating member (56) which is disposed on the seat (44) in the vicinity of a seating area (45).

18. A seat according to claim 16, comprising an arrangement of the compression spring such that, with the valve (20) operated, the throttle element (36) is movable into the position of release by pressure on a resting area of the backrest (46).

* * * * *

UNITED STATES PATENT AND TRADEMARK OFFICE
CERTIFICATE OF CORRECTION

PATENT NO. : 7,152,719 B2  
APPLICATION NO. : 10/967164  
DATED : December 26, 2006  
INVENTOR(S) : Knaust et al.

Page 1 of 1

It is certified that error appears in the above-identified patent and that said Letters Patent is hereby corrected as shown below:

On the Title page, Item [30], insert the following priority information:

Foreign Application Priority Data

Oct. 22, 2003 (DE)  103 49 157.0

Signed and Sealed this

Tenth Day of July, 2007

JON W. DUDAS  
*Director of the United States Patent and Trademark Office*